United States Patent Office.

JOHN JOHNSON, OF BROOKLYN, E. D., NEW YORK.

Letters Patent No. 96,237, dated October 26, 1869.

---

IMPROVED RUBBER COMPOUND FOR PACKING.

---

The Schedule referred to in these Letters Patent and making part of the same.

---

*To all whom it may concern:*

Be it known that I, JOHN JOHNSON, of Brooklyn, E. D., in the county of Kings, and State of New York, have invented a new and improved Elastic Metallic Compound; and I hereby declare that the following is a full, clear, and exact description of the same.

This invention relates to an elastic metallic compound, especially designed as a packing for joints and valves which are exposed to the action of steam, or destructive vapors or liquids; and The nature of the invention consists in a compound composed of caoutchouc or India rubber and a metallic oxide or oxides, with sufficient sulphur for the vulcanization of the compound.

I find that the following formula produces a compound answering the purposes of my invention in a most satisfactory manner:

Caoutchouc, or India rubber, say ten pounds.
Oxide of lead, say ten pounds.
Oxide of tin, say two pounds.
Oxide of zinc, say one and one-half pound.
Sulphur, say one and one-half pound.

The oxides, as well as the sulphur, can be incorporated with the rubber, by working them together, and passing the mass through heated rollers, or in any other suitable manner. The compound may then be placed into the moulds, and vulcanized by subjecting the same to the proper degree of heat, in a manner well known to persons familiar with the art.

The proportions of the ingredients may be varied, and still produce a compound possessing the desired characteristics. And different metallic oxides may be substituted for those named; for instance, in the above formula, oxide of iron may be substituted for the oxide of lead. And, indeed, the formula above given may be varied by the omission of one or more of the ingredients named; for instance, the following formula will produce a compound having the desired characteristics:

Caoutchouc, or India rubber, say ten pounds.
Oxide of lead, say thirteen pounds.
Sulphur, say two pounds.

And so will this formula:

Caoutchouc or India rubber, say ten pounds.
Oxide of lead, say twelve pounds.
Oxide of tin, say one and one-half pound.
Sulphur, say one and one-half pound.

In either of these formulas, oxide of iron could be substituted for the oxide of lead, and in the last formula, oxide of zinc could be substituted for that of tin; and of course it is well understood that the quantity of sulphur and degree of heat used for vulcanizing may be varied to produce a harder or softer compound. Hence, it will be perceived, that not only may different metallic oxides be mixed with rubber and sulphur, to produce the desired compound, but that the proportions may be varied; and, therefore, I do not limit my invention to any precise formula. The object sought is to produce an elastic metallic compound, in which rubber and a metallic oxide, (one or more,) with sufficient sulphur to effect a proper vulcanization thereof, are the principal ingredients.

My elastic metallic compound, as before stated, is especially designed for a packing for valves and joints which are exposed to the action of steam and other destructive vapors or liquids. I find, by actual experiment, that the compound produces a much superior packing for steam-joints than compounds which are composed of rubber mixed with earthy or stony substances, and vulcanized.

As an instance of this, I will say, that in a trial of this improved packing, when it was subjected to a heat due to sixty pounds' pressure of steam, and immediately chilled by pouring cold water upon it, there was no perceptible contraction. Consequently, my improved elastic metallic packing would be, at all times, in perfect operative condition, which cannot be said of packings composed of a mixture of rubber and earthy or stony materials. I have, therefore, produced by this invention a thoroughly efficient and durable packing—one which has been long desired.

What I claim as my invention, and desire to secure by Letters Patent, is—

A compound composed of the ingredients and made in substantially the manner herein specified.

JOHN JOHNSON.

Witnesses:
M. M. LIVINGSTON,
T. B. BEECHER.